No. 772,429. PATENTED OCT. 18, 1904.
H. G. NIDA.
MOTH AND INSECT TRAP.
APPLICATION FILED JAN. 11, 1904.
NO MODEL.
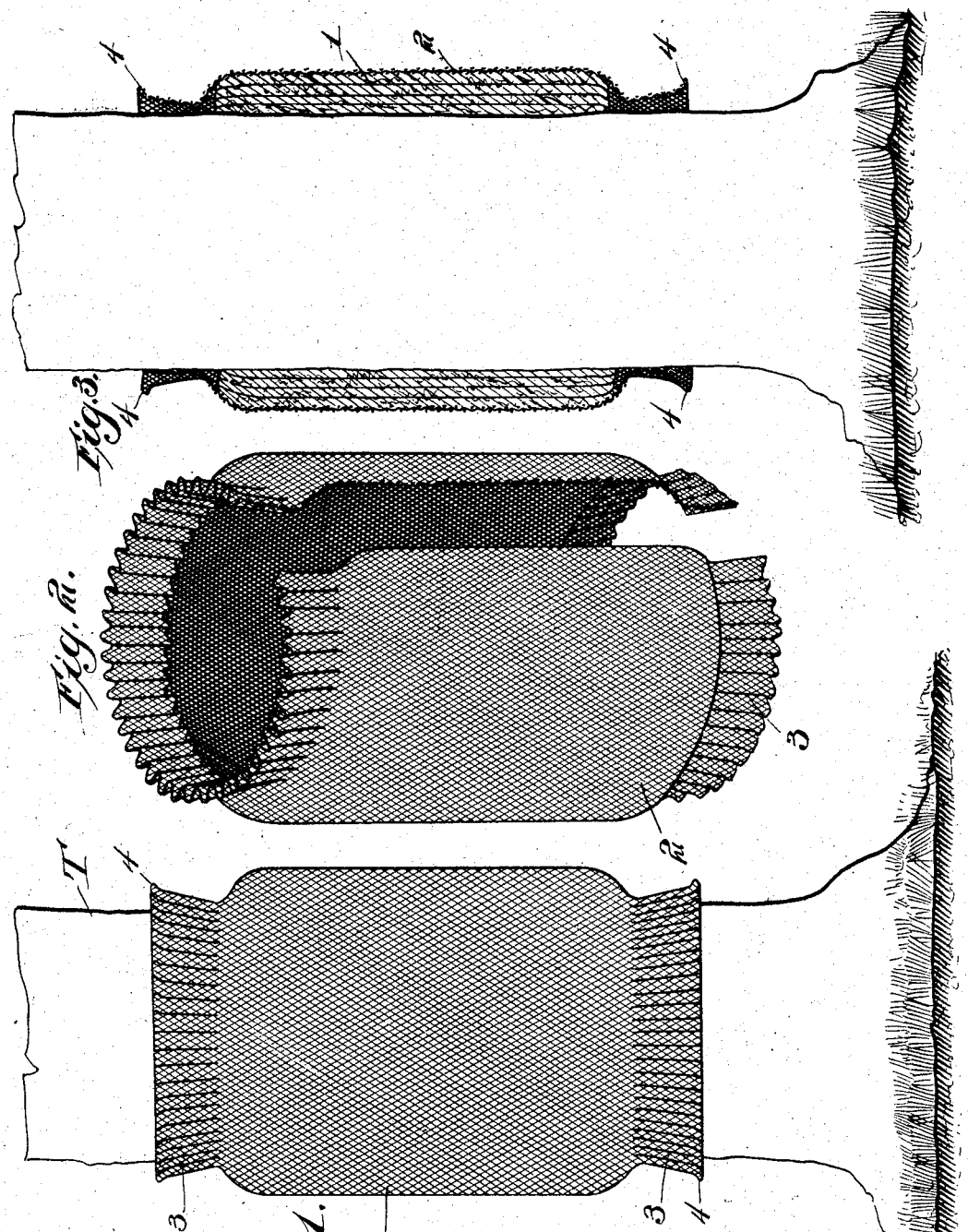
Witnesses
Harrison G. Nida, Inventor
by C. A. Snow & Co.
Attorneys No. 772,429. Patented October 18, 1904.

UNITED STATES PATENT OFFICE.

HARRISON GRANT NIDA, OF DELTA, COLORADO.

MOTH AND INSECT TRAP.

SPECIFICATION forming part of Letters Patent No. 772,429, dated October 18, 1904.

Application filed January 11, 1904. Serial No. 188,605. (No model.)

*To all whom it may concern:*

Be it known that I, HARRISON GRANT NIDA, a citizen of the United States, residing at Delta, in the county of Delta and State of Colorado, have invented a new and useful Moth and Insect Trap, of which the following is a specification.

This invention relates to moth and insect traps, and is designed more particularly for use upon fruit-trees in order to prevent the ravages of the "codling-moth."

As is well known, fruit-growers, and more especially those who are interested in the raising of apples, experience great losses at times from the ravages of the codling-moth, which in its larval state is known as the "apple-worm." This moth lays its eggs in the blossom end of the apples and when the eggs hatch the small worm burrows into the interior of the apple and remains for a certain length of time devouring parts of the apple and growing to full size. After the worm is fully developed it emerges from the apple and descends to the ground by spinning a web, by which it lets itself down. After reaching the ground the worm immediately seeks a place to hide and undergo the change from the larval form to that of a moth. After this change is completed the newly-hatched moth flies up into the apple-tree and deposits its eggs in the blossom ends of the apples in the manner already explained.

In order to prevent the ravages of the codling-moth, it has been the practice of orchardmen for years past to wrap the tree-trunks with burlap bands folded to present three or four layers of burlap and to form a band around the tree of about four or five inches in width. These bands are placed around the trees in order to afford a convenient hiding-place for the worms that descend to the ground from the apples. The object of providing a hiding-place for the worms in which the change from the larval or worm form to the moth form may be accomplished is to insure the orchardmen the opportunity to kill the worms or moths by removing the bands after the worms have hidden themselves among the folds thereof and shaking the worms or moths out upon the ground, where they may be readily destroyed. This method of checking the ravages of the moths is only partially effective, and it is objectionable, because the bands have to be removed several times each season in order to insure the complete destruction of the moths. As this method depends for its effectiveness upon the vigilance of the men or boys who remove the bands in preventing the escape of the worms or moths shaken out of the folds of the bands, it is evident that all of the moths which are developed in the folds of the bands may not be destroyed.

The prime object of the present invention is to insure the destruction of all of the moths that develop from the worms that hide in the bands and also to lessen very largely the labor incident to the destruction of the moths.

The means employed in accomplishing the object above stated consists, essentially, in a covering for the bands of burlap used upon the trees, the covering being of such character that it will permit worms to crawl into the folds of the burlap bands to undergo the transformation into moths, but will absolutely prevent the escape of the moths from the folds of the bands after the transformation mentioned takes place.

The preferred form of cover employed in forming the moth-trap is hereinafter fully described, illustrated in the accompanying drawings, and has the novel features thereof pointed out in the appended claims.

In the drawings, Figure 1 is a view of a tree-trunk protected by means of a folded band of burlap and a cover of the form contemplated in this invention. Fig. 2 is a perspective view of the cover detached. Fig. 3 is a view in vertical section, showing the manner of applying the trap to a tree-trunk.

Referring to the drawings, in which corresponding parts are designated by similar characters of reference, T designates the trunk of an apple-tree, around which a band of folded burlap is secured, as shown at 1. The band 1 consists, preferably, of a piece of burlap or other suitable textile fabric folded twice upon itself to present a sufficient number of folds. External to the band is secured a cover 2, which is formed, preferably, of wire-netting of the character ordinarily used in making window-screens. This netting is formed with meshes between one-sixteenth and one-eighth of an inch square and is ordinarily made of iron wire protected by a coating of enamel paint. The cover 2 is formed by taking a strip of netting of suitable width—say six or eight inches—and crimping it at the margins, as shown at 3, by passing it between suitable crimping-rollers. The strip of netting is also preferably flared outward at the edges, as shown at 4, simultaneously with the crimping operation, so that the edges of the strip of netting may not interfere with the passage of the apple-worms under the netting in their search for a suitable hiding-place in which to accomplish the transformation into the moth form. After passing through the crimping-machine a strip of netting forming a cover 2 will be barrel-shaped, as shown in Fig. 2, and will be ready to be placed upon the apple-tree as a cover for one of the burlap bands. The covers 2 will be made of different sizes to adapt them for use on trees of different diameters; but it is not essential that the size of the cover correspond exactly to the diameter of the tree if the cover be sufficiently large, as the ends may be overlapped to any extent necessary to make the cover fit closely around the burlap band.

In applying the covers to the bands it is essential that the covers be fitted closely at the edges, so that no passages between the covers and the tree-trunk may be left which will be of sufficient size to permit the escape of moths from the covers. Such close fitting of the covers around the tree-trunks will not, however, prevent the entrance of worms into the folds of the bands, as the crimps formed at the margins of the bands will afford passages sufficiently large for the worms.

Each burlap band 1, with the cover 2 placed over it, forms a highly-effective trap for the capture of codling-moths, and the bands with the covers thereover are superior to the bands alone, in that no necessity remains for the frequent removal of the bands and destruction of the worms or moths in the folds thereof. Instead of removing the bands several times in the course of a season, as the custom now is, it will be unnecessary to remove the bands and covers till the end of the season. The worms that crawl under the covers and are transformed into moths in the folds of the burlap bands cannot then escape, as the wings of the moth prevent it from passing through the narrow passages formed by the crimps at the margins of the covers. The moths so imprisoned under the covers over the burlap bands are of course unable to escape and injure the apples on the trees. As the moths cannot obtain their natural food, they soon die, and the necessity of removing the bands and killing the moths from time to time is entirely obviated.

While the material which I prefer to use in making covers for the burlap bands around the tree-trunk is the wire-netting above described, and illustrated in the accompanying drawings, it is to be understood that other material may be employed in lieu of the wire-netting, and I do not desire to limit myself to the use of that material alone.

Having thus described the nature and use of my invention, what I claim as new, and desire to secure by Letters Patent, is—

1. In a moth-trap, a tree-trunk-encircling member consisting of a strip of wire-netting having its marginal portions crimped to afford narrow passages adjacent to the tree-trunk when the tree-trunk-encircling member is in position, said narrow passages being of such dimensions as to permit the passage of moth larvæ but being too small to permit the passage of moths after transformation from the larval state.

2. A moth-trap comprising a tree-trunk-encircling band of textile fabric and a cover therefor consisting of a member extending above and below the fabric band and fitted closely around the tree-trunk, said cover member being provided at its margins with narrow passages through which moth larvæ will pass but which will not permit the escape of fully-formed moths.

3. A moth-trap comprising a tree-trunk-encircling band of textile fabric and a cover therefor consisting of a member extending above and below the fabric band and fitting closely around the tree-trunk near the margins, said cover being provided at the points where it contacts with the tree-trunk with narrow passages through which moth larvæ may pass and having the edges flared outward from the tree-trunk to avoid interference with the passage of said larvæ through the passages provided for them.

In testimony that I claim the foregoing as my own I have hereto affixed my signature in the presence of two witnesses.

HARRISON GRANT NIDA.

Witnesses:
  MILLARD FAIRLAMB,
  S. L. FAIRLAMB.